United States Patent
Shamshoum et al.

(10) Patent No.: US 6,635,734 B2
(45) Date of Patent: *Oct. 21, 2003

(54) CATALYST SYSTEM TO PRODUCE HIGHLY CRYSTALLINE POLYPROPYLENE

(75) Inventors: Edwar S. Shamshoum, Houston, TX (US); Sehyun Kim, Houston, TX (US)

(73) Assignee: Fina Technology, Inc., Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/474,233

(22) Filed: Jun. 7, 1995

(65) Prior Publication Data

US 2003/0060580 A1 Mar. 27, 2003

Related U.S. Application Data

(62) Division of application No. 08/233,671, filed on Apr. 26, 1994, now abandoned.

(51) Int. Cl.⁷ .............................................. C08F 110/06
(52) U.S. Cl. .................. 526/351; 526/107; 526/125.1; 526/128; 502/103; 502/104; 502/115; 502/116; 502/118

(58) Field of Search ............................. 526/125, 125.3, 526/107, 351, 125.1, 128; 502/103, 104, 115, 116, 118

(56) References Cited

U.S. PATENT DOCUMENTS

4,861,847 A * 8/1989 Mao et al. ................... 526/125
4,990,479 A * 2/1991 Ishimaru et al. ............ 526/125

FOREIGN PATENT DOCUMENTS

| EP | 0258485 | 3/1988 |
| EP | 0350170 | 1/1990 |
| EP | 0601496 | 6/1994 |
| JP | 56-34714 | * 4/1981 |
| JP | 59206410 | 11/1984 |

* cited by examiner

*Primary Examiner*—Ling-Siu Choi
(74) *Attorney, Agent, or Firm*—Bradley A. Misley

(57) ABSTRACT

The present invention provides polypropylene having xylene solubles from 0.6 to 1.5 weight percent and isotacticity equal to or greater than about 98.0 percent. The polypropylene is obtained by contacting propylene monomer under suitable polymerization conditions with (a) a Ziegler-Natta catalyst, (b) a co-catalyst, and (c) an electron donor.

18 Claims, No Drawings

CATALYST SYSTEM TO PRODUCE HIGHLY CRYSTALLINE POLYPROPYLENE

This is a Divisional application of application Ser. No. 08/233,671, filed on Apr. 26, 1994 now abandoned.

BACKGROUND

1. Technical Field

The present invention provides a catalyst system for the polymerization of propylene to produce highly crystalline polypropylene that includes the combination of a conventional supported Ziegler-Natta catalyst with an electron donor compound having the general formula $SiR_m(OR')_{4-m}$ where R is selected from the group consisting of an alkyl group, a cycloalkyl group, an aryl group and a vinyl group; R' is an alkyl group; and m is 0–3, wherein when R is an alkyl group, R may be identical with R'; when m is 0, 1 or 2, the R' groups may be identical or different; and when m is 1, 2 or 3, the R groups may be identical or different. The electron donor preferably has the formula:

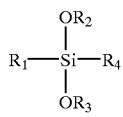

wherein $R_1$ is an alkyl or cycloalkyl group containing a primary, secondary or tertiary carbon atom attached to the silicon atom; $R_2$ and $R_3$ alkyl or aryl groups; and $R_4$ is an alkyl or cycloalkyl group with a secondary or tertiary carbon atom attached to the silicon atom, $R_1$ and $R_4$ can be the same or different and $R_2$ and $R_3$ can be the same or different.

2. Description of Prior Art

Catalyst systems for the polymerization of olefins are well known in the art. Typically, these systems include a Ziegler-Natta type polymerization catalyst; a co-catalyst, usually an organoaluminum compound; and an electron donor, usually an organosilicon compound. Examples of such catalyst systems are shown in the following U.S. Pat. Nos. 4,107,413; 4,2394,721; 4,439,540; 4,115,319; 4,220,554; 4,460,701; and 4,562,173; the disclosures of these patents are hereby incorporated by reference. These are just a few of the scores of issued patents relating to catalysts and catalyst systems designed primarily for the polymerization of propylene and ethylene.

A conventional supported Ziegler-Natta polymerization catalyst generally comprises a complex derived from a halide of a transition metal, for example, titanium, chromium or vanadium with a metal hydride and/or a metal alkyl that is typically an organoaluminum compound. The catalyst is usually comprised of a titanium halide supported on a magnesium compound complexed with an alkyaluminum. An external electron donor or selectivity control agent (SCA) can be added to improve the stereoregulation of the catalyst so that a more crystalline polymer is produced.

The development of these polymerization catalysts has improved catalyst and polymer properties. In addition to the improved catalysts, improved activation methods have also lead to increases in the catalyst efficiency. One improved activation method includes a process for pre-polymerizing the catalyst just prior to introducing the catalyst into the reaction zone. One such pre-polymerization process is disclosed in U.S. Pat. No. 4,767,735, the disclosure of which is hereby incorporated by reference.

In addition to the development of new catalysts and new reaction processes, a discovery of an appropriate electron donor to go with a supported Ziegler-Natta catalysts in forming a total catalyst system has been found to be of great benefit to the polymerization art in leading to dramatic improvements in the catalyst and polymer properties. In such a catalyst system, it is believed that a co-catalyst activates the catalyst and provides the initiation of a polymer chain. A co-catalyst that works well with a supported Ziegler-Natta catalyst component is an organoaluminum compound, usually an alkyaluminum and most typically a trialkylaluminum, such as triethylaluminum (TEA) or tri-isobutylaluminum (TIBAI). Examples of other organoaluminum compounds useful as a co-catalyst for a conventional supported Ziegler-Natta catalyst component include an alkylaluminum dihalide and a dialkylaluminum halide.

An electron donor compound is used in the polymerization reaction to reduce the atactic form of the polymer thereby giving control of and increasing the production of stereoregular or crystalline polymers. Although a broad range of compounds are known generally as electron donors, a particular catalyst may have a specific compound or group of compounds with which it is especially compatible. Discovery of an appropriate type of electron donor which gives good catalyst efficiency as well as improved control of the isotactic index of the desired polymer product and other properties of the product would be highly advantageous. One such group of electron donors are disclosed in U.S. Pat. No. 4,927,797.

The present invention comprises another such discovery. It has been surprisingly discovered that a specific group of silane compounds serving as electron donors in combination with a particular type of catalyst results in significant increases in crystallinity of the polymer produced over the previously known crystallinity for this particular type of catalyst as well as other known catalyst systems.

SUMMARY OF THE INVENTION

The present invention provides a catalyst system for the polymerization of propylene wherein the system includes the combination of a particular type of catalyst with a specific group of electron donor compounds which results in significant increases in the crystallinity of the polymer product. The catalyst comprises a conventional supported Ziegler-Natta catalyst component, an organoaluminum co-catalyst and an organosilicon electron donor. This combination results in a catalyst system that produces a polymer product with significantly higher crystallinity (lower xylene solubles) than provided by previous catalyst systems as illustrated by the comparative examples included below. Further, the catalyst system of the present invention using a particular conventional supported Ziegler-Natta catalyst component provides better control of the xylene solubles of the polymer product than with other types of catalyst components. Further, the catalyst system of the present invention using a particular electron donor provides better control of the xylene solubles of the polymer product than with other types of electron donors. These and other beneficial advantages will become more apparent from the following detailed description of the invention and the accompanying examples.

The above-described catalyst exhibits some increase in crystallinity of the polymer product over previously known catalysts when it is paired with a previously used electron donor, but that increase is significantly greater when the catalyst is paired with electron donors as described by the present invention. The invention provides improved operational control of the properties of the polymer product such as the xylene solubles.

The most significant unexpected result obtained from the combination of the catalyst described in U.S. Pat. Nos. 4,784,983 and 4,861,847 and CMDS, DIDS, DTDS, CPDS and CIDS is the dramatic increase in the crystallinity of the polymer produced by the catalyst system in the polymerization of propylene. The catalyst system has been shown to achieve efficiencies higher than 30 kg/g-cat·h for Si/Ti mole ratios within the range 4–200.

The invention also provides a process for the polymerization of propylene. The process comprises:

forming a catalyst by contacting a supported Ziegler-Natta catalyst component with an organoaluminum compound, preferably with a trialkylaluminum;

contacting the catalyst with an electron donor either simultaneously with or after contact with the organoaluminum, the electron donor being an organosilicon compound as described by the formula above, optionally, pre-polymerizing the catalyst by contacting a small amount of monomer with the catalyst;

introducing the catalyst into a reaction zone under polymerization conditions containing the monomer and, optionally additional amounts of organoaluminum compound and the electron donor; and withdrawing a polymer product.

If the monomer is propylene, the xylene solubles are within the range of 0.6–3.00 wt %, while the Si/Ti ratio in the reaction zone is within the range 4–200. If the electron donor is dicyclopentyldimethoxysilane and the monomer is propylene, the crystallinity as defined by the isotacticity (per cent pentad distribution of the xylene insoluble fraction) of the polymer product is equal to or greater than 98%.

DETAILED DESCRIPTION OF THE INVENTION

The present invention relates to the combination of a particular group of compounds as electron donors with a particular type of catalyst for use in the polymerization of propylene.

It has been discovered that a particular group of electron donors does significantly enhance the catalytic properties of a conventional supported Ziegler-Natta catalyst. Any of the conventional Ziegler-Natta transition metal compound catalyst components can be used in the present invention. Electron donors are typically used in two ways in the formation of a Ziegler-Natta catalyst and a catalyst system. First, an internal electron donor may be used in the formation reaction of the catalyst as the transition metal halide is reacted with the metal hydride or metal alkyl.

The internal electron-donor compounds suitable for preparing conventional Ziegler-Natta catalyst components include ethers, eketones, lactones, electron donors compounds with N, P and/or S atoms and specific classes of esters. Particularly suitable are the esters of phthalic acid, such as diisobutyl, dioctyl, diphenyl and benzylbutylphthalate; esters of malonic acid, such as diisobutyl and diethylmalonate; alkyl and arylpivalates; alkyl, cycloalkyl and arylmaleates; alkyl and aryl carbonates such as diisobutyl, ethyl-phenyl and diphenylcarbonate; succinic acid esters, such as mono and diethyl succinate. These esters of phthalic acid are the preferred donors.

The second use for an electron donor in a catalyst system is as an external electron donor and stereoregulator in the polymerization reaction. The same compound may be used in both instances, although typically they are different. A common external electron donor is an organic silicon compound, for example, cyclohexylmethyl dimethoxysilane (CMDS). A description of the two types of electron donors is provided in U.S. Pat. No. 4,535,068, the disclosure of which is hereby incorporated by reference.

The conventional Ziegler-Natta catalyst component comprises a compound of the general formula $MR^+_x$ where M is the metal, R is a halogen or a hydrocarboxyl and x is the valence of the metal. Preferably, M is a transition metal, more preferably, Group IVB, VB or VIB metal, most preferably a Group IVB, and specifically titanium. Preferably, R is chlorine, bromine, an alkoxy or a phenoxy, more preferably chlorine or ethoxy and most preferably, chlorine. Illustrative examples of the transition metal compound catalyst components are $TiCl_4$, $TiBr_4$, $Ti(OC_2H_5)_3Cl$, $Ti(OC_2H_5)_3Cl$, $Ti(OC_3H_7)_2Cl_2$, $TiOC_6H_{13})_2Cl_2$, $Ti(OC_2H_5)_2Br_2$ and $Ti(OC_{12}H_{25})Cl_3$. Mixtures of the transition metal compounds may be used. No restriction on the number of transition metal compounds is made as long as at least one transition metal compound is present.

The support should be an inert solid which is chemically unreactive with any of the components of the conventional Ziegler-Natta Catalyst. The support is preferably a magnesium compound. Examples of the magnesium compounds which are to be used to provide a support source for the catalyst component are magnesium halides, dialkoxymagnesiums, alkoxymagnesium halides, magnesium oxyhalides, dialkylmagnesiums, magnesium oxide, magnesium hydroxide, and carboxylates of magnesium.

The organoaluminum compound which acts as a co-catalyst is preferably an alkylaluminum of the general formula $AlR'_3$ where R' is an alkyl of from 1–8 carbon atoms or a halogen, R' being the same or different with at least one $R^1$ being an alkyl and R' being the same or different. Preferably, the organoaluminum compound is an alkylaluminum, an alkylaluminum dihalide or a dialkylaluminum halide. More preferably, R' is an alkyl making the alkylaluminum a trialkylaluminum. Most preferably, the alkylaluminum is an trialkylaluminum such as triethylaluminum (TEAl) or triisobutylaluminum (TIBAl).

One particular Ziegler-Natta catalyst component which can be used in the present invention is a commercially available Ziegler-Natta catalyst component for the polymerization of olefins comprising:

a catalyst component consisting essentially of about 1.5–6.0% by weight or titanium, about 10–20% by weight of magnesium, about 40–70% by weight of a halide selected from the group consisting of chlorine, bromine, and iodine; about 5–25% by weight of a polycarboxylic ester selected from the group consisting of the esters of aliphatic, aromatic and alicyclic polycarboxylic acids; and about 0.1–2.5% by weight of an organic phosphorus compound selected from the group consisting of hydrocarbon esters of phosphoric acid and phosphorus acid wherein each hydrocarbon group has 1 to 6 carbon atoms, said catalyst component being prepared by a process having the following steps:

a) dissolving in a solvent mixture a magnesium halide compound selected from the group consisting of magnesium halide complexes of magnesium halide with water or alcohol and derivatives of magnesium halide wherein a halogen atom is replaced by a hydrocarboxyl group or a halohydrocarboxyl group; the solvent mixture consisting of an organic epoxy compound, selected from the group consisting of oxides of aliphatic olefins and diolefins, oxides of halogenated aliphatic olefins and diolefins and glycidyl ethers, all having 2 to 8 carbon atoms, and an organic phosphorus compound selected from the group consisting of alkyl phosphates, aryl phosphates, aralkyl phosphates, alkyl phosphites, aryl phosphites and aralkyl phosphites where alkyl has one to four carbon atoms and aryl has six to ten carbon atoms to form a homogeneous solution;

b) mixing the homogeneous solution with a liquid titanium compound having the formula $TiX_n(OR)_{4-n}$ wherein X is halogen, R is an alkyl group being identical or different and n is an integer of 0 to 4;

c) adding at least one auxiliary precipitant selected from the group consisting of carboxylic acid anhydrides, carboxylic acids, ethers and ketones to form a precipitate;

d) adding a polycarboxylic acid ester when a precipitate appears;

e) separating the precipitate from the mixture and treating the separated precipitate with titanium compound, $TiX_n(OR)_{4-n}$ wherein X is halogen, R is a hydrocarbon group and may be identical or different, and n is and integer of from 0 to 4, or a mixture thereof, in an inert diluent; and f) washing the treated precipitate with an organic inert diluent as disclosed in U.S. Pat. Nos. 4,861,847 and 4,784,983, the disclosures of which are hereby incorporated.

The preferred auxiliary precipitant useful in the formation of the catalyst is an organic carboxylic acid anhydride, more preferably phthalic acid anhydride, added in the amount of 0.03 to 1.0 moles per mole of magnesium halide. The preferred polycarboxylic ester is selected from the group consisting of the esters of aromatic polycarboxylic acids, preferably dibutyl phthalate and di-isobutyl phthalate. The preferred inert diluent for washing the precipitate is 1,2-dichloroethane. Suitable titanium tetrahalides include $TiCl_4$, $TiBr_4$ and $TiI_4$, with $TiCl_4$ being preferred.

As the present invention relates particularly to external electron donors, the term "electron donor" as used herein, refers to the external donor. The external electron donor acts as a stereoregulator to control the amount of atactic form of polymer produced. It may also increase the production of isotactic polymers. Organic silicon compounds are known in the art for use as electron donors. Examples of electron donors that are organic silicon compounds are disclosed in U.S. Pat. Nos. 4,218,339; 4,395,360; 4,328,122; 4,473,660 and 4,927,797. As mentioned, particular catalyst may produce better results when paired with a particular group of electron donors. Examples of this pairing of catalyst and electron donors are disclosed in U.S. Pat. Nos. 4,562,173; 4,547,552; and 4,927,797.

The electron donor is of the general formula $SiR_m(OR')_{4-m}$ where R is selected from the group consisting of an alkyl group, a cycloalkyl group, an aryl group and a vinyl group; R' is an alkyl group; and m is 0–3, wherein when R is an alkyl group, R may be identical with R'; when m is 0, 1 or 2, the R' groups may be identical or different; and when m is 1, 2 or 3, the R groups may be identical or different. Preferably, the electron donor is selected from a organosilicon compound of the following formula:

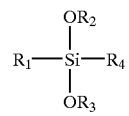

wherein $R_1$ is an alkyl or cycloalkyl group containing primary, secondary or tertiary carbon atom attached to the silicon; $R_2$ and $R_3$ are alkyl or aryl groups; and $R_4$ is an alkyl or cycloalkyl group with a secondary or tertiary carbon atom attached to the silicon atom, $R_1$ and $R_4$ being the same or different and $R_2$ and $R_3$ being the same or different. In a preferred embodiment, $R_1$ is a secondary alkyl group of 3–5 carbon atoms having mirror image symmetry; $R_2$ and $R_3$ are methyl, ethyl, propyl, or butyl groups and not necessarily the same; and $R_4$ is secondary alkyl or cycloalkyl group of 3–6 carbon atoms having mirror image symmetry. More preferably, $R_1$ and $R_4$ are the same and are a cycloalkyl group, specifically a group of 5 carbon atoms, i.e. cyclopentyl. Specific electron donors are cyclohexylmethyldimethoxysilane (CMDS), disopropyldimethoxysilane (DIDS), di-t-butyldimethoxysilane (DTDS), dicyclopentyldimethoxysilane (CPDS) and cyclohexylisopropyldimethoxysilane (CIDS), most preferred being dicyclopentyl dimethoxysilane (CPDS). The combination of the electron donor described above and a conventional supported Ziegler-Natta catalyst yields wholly unexpected results that surpass previously known catalyst systems. The electron donors as described by the present invention may be limited by the stability of the compound and the ease of handling including storage, transportation and use in the plant.

The catalyst system is capable of achieving high efficiencies over a wide range of Si/Ti ratios (4–200) while exhibiting a control of the formation of atactic polymer, or xylene solubles, at relatively low levels, resulting in a high isotactic index. When another catalyst is paired with these above described electron donors, the polymer product exhibits a sharp increase in the xylene solubles. The present catalyst system using a particular supported Ziegler-Natta catalyst component with CMDS, DIDS, DTDS, CPDS or CIDS, however, exhibits low xylene solubles from about 0.6 to about 3.0% as the Si/Ti ratio decreases from 200 to 4 and below.

The catalyst system with CPDS also provides higher crystallinity in the polymer product. The per cent of meso pentads (mmmm) of the heptane insoluble fraction of the polymer product is very high, being equal to or greater than 97%.

The present invention also provides a process for the polymerization of propylene using the catalyst and the electron donors described by the above formula comprising:

a) selecting a conventional supported Ziegler-Natta catalyst component;

b) contacting the catalyst with an organoaluminum compound;

c) contacting the catalyst with an electron donor as described above;

d) introducing the catalyst into a polymerization reaction zone containing the organoaluminum compound, the electron donor and the monomer; and e) extracting polymer product from the reactor.

Although the catalyst system may be used in almost any commercially known polymerization process, the preferred process of the present invention includes a pre-polymerization of the catalyst by contacting a small amount of monomer with the catalyst after the catalyst has been contacted with the electron donor. One pre-polymerization process is described in U.S. Pat. Nos. 4,767,735, and 4,927,797, incorporated by reference above. As provided in those disclosures, a carrier stream for the catalyst is provided, the catalyst is contacted with the co-catalyst or organoaluminum compound, the catalyst is contacted with the electron donor, the catalyst stream is contacted with a relatively small amount of the total amount of monomer to be polymerized, the catalyst stream passes through a tubular reactor, and the pre-polymerized catalyst and catalyst stream are introduced into the polymerization reaction zone. The electron donor may be contacted with the catalyst simultaneously with the co-catalyst. A polymer product may then be withdrawn from the reactor. In using the described catalyst with the electron donors described by the formula above, the catalyst may have an efficiency of above 30 kg/g-cat·h while the Si/Ti mole ratio in the reaction is within the range 1–10. The polymer product may also be characterized by xylene solubles within the range 2–10 wt %.

The following Examples and Comparative Examples illustrate the present invention and its various advantages in more detail. The results are summarized in Tables 1–2. The catalyst used in the Examples was believed to be prepared with the materials and processes as disclosed in U.S. Pat. Nos. 4,861,847 and 4,784,983 and is sold by Catalyst Resources, Inc. under the tradename of "Lynx 1000". the catalyst used in the Comparative Examples was believed to be prepared with the materials and processes as disclosed in U.S. Pat. Nos. 4,927,797; 4,816,433 and 4,839,321 and is sold by Toho Titanium, Inc. under the tradename "THC-32A".

EXAMPLE 1

Prior to a polymerization run, all traces of moisture and air were expelled from the reactor by heating to a temperature over 100° C. for a minimum of 30 minutes under a constant purge of dry nitrogen. Following this heating, the reactor was cooled to room temperature (25° C.) under nitrogen. The reactor was stabilized at room temperature and then 32 mmoles of hydrogen and 1.45 L of propylene were added. The reactor was stirred at 1300 rpm and the temperature was raised to 70° C. 1.0 mmole of TEAI and 0.1 mmole of cyclohexylmethyldimethoxysilane (CMDS) were added to a 40 cc tubular reaction vessel. The TEAI and donor were allowed to pre-contact approximately one minute. Ten milligrams of catalyst in a mineral oil suspension were added to the 40 cc reaction cylinder. The catalyst was allowed to pre-contact the TEAI and donor mixture for approximately two minutes. The tubular reaction vessel was then attached to an entry point on the reactor and filled with room temperature liquid propylene which was allowed to polymerize for about five seconds to effect prepolymerization of the catalyst. the contents of the vessel were then flushed into the reactor with 1.45 L of room temperature propylene. The total amount of liquid propylene present in the reactor was about 2.9 L. The polymerization reaction was allowed to proceed for one hour, at which point it is terminated by venting the excess propylene and cooling the reactor to room temperature.

The reactor was then opened to collect the polymer product which was dried, weighed and analyzed. The Si/Ti mole ratio was calculated from the molar amount of electron donor used divided by the motor amount of catalyst. The xylene solubles were measured by dissolving the polymer in hot xylene, cooling the solution to 0° C. and precipitating out the isotactic form. The xylene solubles are the wt % of the polymer that was soluble in the cold xylene. The pentad distribution was determined by NMR analysis. Polymer fluff was dissolved in boiling xylene and then the polymer was precipitated in methanol by adding xylene solution dropwise into methanol while stirring. The precipitates were collected by filtration and then extracted with boiling heptane overnight. The results are shown in Table 1.

| SUMMARY OF POLYMERIZATION CONDITIONS | |
|---|---|
| wt. of catalyst: | 10.0 mgrams |
| amount of TEAL (co-catalyst): | 1.0 mmoles |
| amount of CMDS (electron donor): | 0.1 mmoles |
| Al/Ti: | 200 |
| Al/Si: | 10 |
| Si/Ti: | 20 |
| Hydrogen: | 240 Apsig |
| Propylene: | 2.9 L (1500 g) |
| Temp.: | 70° C. |
| Time: | 1 hr. |

EXAMPLES 2–9

The procedures of Example 1 were repeated except that the total amount of CMDS was varied as indicated in Table 1 from 1 mmoles to 0.002 mmoles. The results are tabulated in Table 1.

EXAMPLES 10–15

The procedures of Example 1 were repeated except diisopropyldimethoxysilane (DIDS) was used instead of CMDS and the total amount of DIDS was varied as indicated in Table 1 from 2 mmoles to 0.0033 mmoles. The results are shown in Table 1.

EXAMPLES 16–18

The procedures of Example 1 were repeated except di-t-butyldimethoxysilane (DTDS) was used instead of CMDS and the total amount of DTDS was varied as indicated in Table 1 from 2 mmoles to 0.05 mmoles. The results are shown in Table 1.

EXAMPLES 19–24

The procedures of Example 1 were repeated except dicyclopentyldimethoxysilane (CPDS) was used instead of CMDS and the total amount of CPDS was varied as indicated in Table 1 from 2 mmoles to 0.0033 mmoles. The results are shown in Table 1.

EXAMPLES 25–30

The procedures of Example 1 were repeated except cyclohexylisopropyl dimethoxysilane (CIDS) was used instead of CMDS and the total amount of CIDS was varied as indicated in Table 1 from 2 mmoles to 0.0033 mmoles. The results are shown in Table 1.

Comparative Examples 1–30

The procedures of Example 1 were repeated except that another commercially available Ziegler-Natta catalyst component was substituted for the catalyst component used in Examples 1–30. The results are shown in Table 2.

TABLE 1

| Example | TEAl mmol | mmol | Al/Si | Catalyst mg | Yield g | Xylene Solubles wt % | Isotacticity % mmmm |
|---|---|---|---|---|---|---|---|
| CMDS | | | | | | | |
| 1 | 1 | 2 | 0.5 | 10 | 51 | 3.0 | |
| 2 | 1 | 1 | 1.0 | 10 | 51.4 | 2.3 | |
| 3 | 1 | 0.5 | 2.0 | 10 | 102 | 1.4 | |
| 4 | 1 | 0.1 | 10 | 10 | 195 | 1.7 | 96 |
| 5 | 1 | 0.05 | 20 | 10 | 216 | 2.0 | |
| 6 | 1 | 0.033 | 30 | 10 | 172 | 3.2 | |
| 7 | 1 | 0.02 | 50 | 10 | 269 | 2.3 | |
| 8 | 1 | 0.01 | 100 | 10 | 234 | 5.1 | |
| 9 | 1 | 0.002 | 500 | 10 | 124 | 23.7 | |
| DIDS | | | | | | | |
| 10 | 1 | 2 | 0.5 | 10 | 101 | 0.8 | |
| 11 | 1 | 1 | 1.0 | 10 | 133 | 1.1 | |
| 12 | 1 | 0.5 | 2.0 | 10 | 204 | 1.2 | |
| 13 | 1 | 0.1 | 10 | 10 | 278 | 1.6 | |
| 14 | 1 | 0.05 | 20 | 10 | 223 | 2.8 | |
| 15 | 1 | 0.033 | 30 | 10 | 225 | 2.1 | |
| DTDS | | | | | | | |
| 16 | 1 | 2 | 0.5 | 10 | 208 | 1.4 | |
| 17 | 1 | 1 | 1.0 | 10 | 246 | 1.6 | |
| 18 | 1 | 0.5 | 2.0 | 10 | 195 | 1.5 | |
| CPDS | | | | | | | |
| 19 | 1 | 2 | 0.5 | 10 | 105 | 1.1 | 98.4 |
| 20 | 1 | 1 | 1.0 | 10 | 136 | 1.0 | 98.4 |
| 21 | 1 | 0.5 | 2.0 | 10 | 210 | 0.9 | 97.9 |
| 22 | 1 | 0.1 | 10 | 10 | 260 | 0.9 | 98.5 |
| 23 | 1 | 0.05 | 20 | 10 | 315 | 0.6 | |
| 24 | 1 | 0.033 | 30 | 10 | 249 | 0.6 | 98.5 |
| CIDS | | | | | | | |
| 25 | 1 | 2 | 0.5 | 10 | 70 | 0.9 | 98.4 |
| 26 | 1 | 1 | 1.0 | 10 | 127 | 0.9 | |
| 27 | 1 | 0.5 | 2.0 | 10 | 181 | 0.9 | |
| 28 | 1 | 0.1 | 10 | 10 | 119 | 1.6 | |
| 29 | 1 | 0.05 | 20 | 10 | 134 | 2.0 | |
| 30 | 1 | 0.033 | 30 | 10 | 157 | 2.4 | |

TABLE 2

| Comparative Example | TEAl mmol | mmol | Al/Si | Catalyst mg | Yield g | Xylene Solubles wt % | Isotacticity % mmmm |
|---|---|---|---|---|---|---|---|
| CMDS | | | | | | | |
| 1 | 1 | 2 | 0.5 | 10 | 48 | 4.1 | |
| 2 | 1 | 1 | 1.0 | 10 | 142 | 0.9 | |
| 3 | 1 | 0.5 | 2.0 | 10 | 205 | 1.5 | |
| 4 | 1 | 0.1 | 10 | 10 | 269 | 1.4 | 95 |
| 5 | 1 | 0.05 | 20 | 10 | 249 | 2.8 | |
| 6 | 1 | 0.033 | 30 | 10 | 269 | 7.1 | |
| 7 | 1 | 0.02 | 50 | 10 | 280 | 8.7 | |
| 8 | 1 | 0.01 | 100 | 10 | 302 | 6.8 | 93.6 |
| 9 | 1 | 0.002 | 500 | 10 | 294 | 15.7 | 91.6 |
| DIDS | | | | | | | |
| 10 | 1 | 2 | 0.5 | 10 | 163 | 2.9 | 92.2 |
| 11 | 1 | 1 | 1.0 | 10 | 214 | 3.1 | 95 |
| 12 | 1 | 0.5 | 2.0 | 10 | 294 | 2.9 | 96 |
| 13 | 1 | 0.1 | 10 | 10 | 305 | 2.4 | |
| 14 | 1 | 0.05 | 20 | 10 | 249 | 2.5 | |
| 15 | 1 | 0.033 | 30 | 10 | 243 | 2.8 | |
| DTDS | | | | | | | |
| 16 | 1 | 2 | 0.5 | 10 | 274 | 3.9 | |
| 17 | 1 | 1 | 1.0 | 10 | 246 | 3.1 | 96 |
| 18 | 1 | 0.5 | 2.0 | 10 | 309 | 3.7 | |
| CPDS | | | | | | | |
| 19 | 1 | 2 | 0.5 | 10 | 140 | 2.9 | 97.9 |
| 20 | 1 | 1 | 1.0 | 10 | 209 | 3.1 | |
| 21 | 1 | 0.5 | 2.0 | 10 | 281 | 2.9 | 96.6 |
| 22 | 1 | 0.1 | 10 | 10 | 294 | 2.4 | |
| 23 | 1 | 0.05 | 20 | 10 | 346 | 2.5 | |
| 24 | 1 | 0.033 | 30 | 10 | 307 | 2.8 | 97.7 |
| CIDS | | | | | | | |
| 25 | 1 | 2 | 0.5 | 10 | 98 | 2.4 | |
| 26 | 1 | 1 | 1.0 | 10 | 195 | 1.8 | |
| 27 | 1 | 0.5 | 2.0 | 10 | 237 | 2.0 | |
| 28 | 1 | 0.1 | 10 | 10 | 267 | 2.3 | |
| 29 | 1 | 0.05 | 20 | 10 | 206 | 2.4 | |
| 30 | 1 | 0.033 | 30 | 10 | 224 | 2.4 | |

The crystallinity of polypropylene is controlled by stereoregularity, i.e., isotacticity (% mmmm), as well as the amounts of atactic polymers present. Generally, the isotacticity of xylene and/or heptane insoluble fractions increases with decreasing xylene solubles. As the data above demonstrates, certain electron donors in combination with a specific catalyst component produces relatively small amounts of xylene solubles. This phenomenon is enhanced when CPDS is used with the specific catalyst component.

As shown in the Examples and Table 1 and 2 above, xylene solubles are generally significantly lower for the combination of each electron donor with the specific catalyst component of Examples 1–27 and Table 1 when compared with the same electron donors of Comparative Examples 1–27 and Table 2. As shown in Examples 16–21 and Tables 1 and 2, use of CPDS with the catalyst component as described produces propylene having the lowest relative xylene solubles and the relative highest crystallinity. The combination of CPDS with the catalyst component as described has increased activity over combinations of other electron donors with the catalyst component.

What is claimed as new and desired to be secured by Letter of Patent of the United States of America is:

1. Polypropylene comprising xylene solubles from 0.6 to 1.5 weight percent and isotacticity equal to or greater than about 98.0 percent.

2. The polypropylene of claim 1 wherein the xylene solubles are from 0.6 to 1.1 weight percent.

3. The polypropylene of claim 1 wherein the isotacticity is equal to or greater than 98.4 percent.

4. The polypropylene of claim 2 wherein the isotacticity is equal to or greater than 98.4 percent.

5. A process for making polypropylene, comprising contacting propylene monomer under suitable polymerization conditions with:
   (a) a Ziegler-Natta catalyst;
   (b) a co-catalyst; and
   (c) an electron donor,
wherein the polypropylene comprises xylene solubles from 0.6 to 1.5 weight percent and isotacticity equal to or greater than about 98.0 percent.

6. The process of claim 5 wherein the electron donor is cyclohexylmethyldimethoxysilane, diisopropyldimethoxysilane; di-t-butyldimethoxysilane; cyclohexylisopropyldimethoxysilane; or dicyclopentyldimethoxysilane.

7. The process of claim 6 wherein the electron donor is dicyclopentyldimethoxysilane.

8. The process of claim 6 wherein the Ziegler-Natta catalyst comprises a compound of the general formula $MR_x$ where M is a metal, R is a halogen or hydrocarboxyl, and the x is the valence of the metal.

9. The process of claim 7 wherein the Ziegler-Natta catalyst comprises a compound of the general formula $MR_x$ where M is a metal, R is a halogen or hydrocarboxyl, and x is the valence of the metal.

10. The process of claim 8 wherein the co-catalyst comprises an organoaluminum compound.

11. The process of claim 9 wherein the co-catalyst comprises an organoaluminum compound.

12. The process of claim 9 wherein the xylene solubles are from 0.6 to 1.1 weight percent.

13. The process of claim 9 wherein the isotacticity is equal to or greater than 98.4 percent.

14. The process of claim 10 wherein the isotacticity is equal to or greater than 98.4 percent.

15. The process of claim 10 wherein the ratio of aluminum to silicon (Al/Si) is from 0.5 to 100 molar ratio.

16. The process of claim 11 wherein the ratio of aluminum to silicon (Al/Si) is from 0.5 to 100 molar ratio.

17. The process of claim 12 wherein the ratio of aluminum to silicon (Al/Si) is from 0.5 to 100 molar ratio.

18. The process of claim 8 wherein the molar ratio of silicon to metal (Si/M) is from 4 to 200.

* * * * *